UNITED STATES PATENT OFFICE.

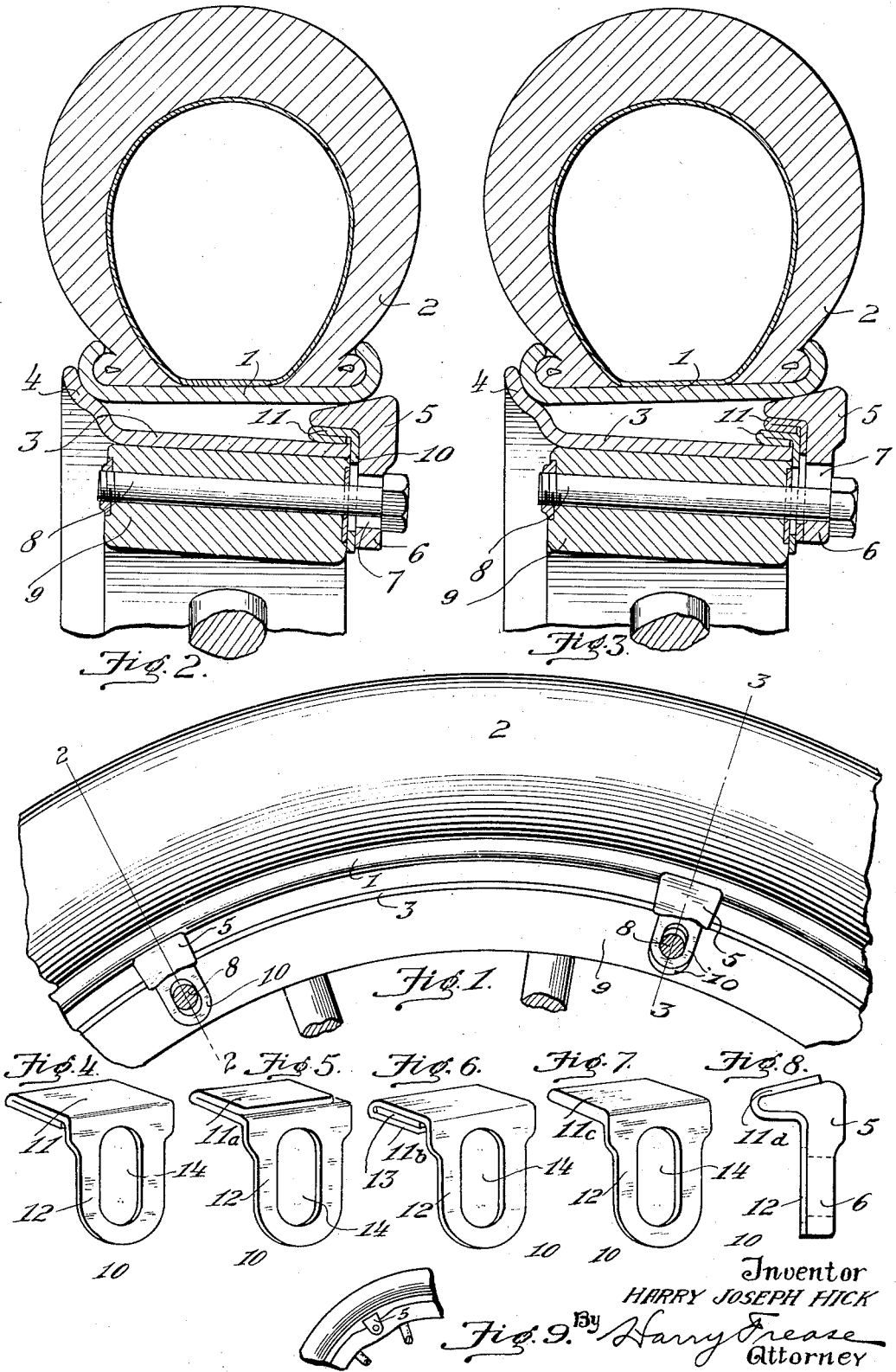

HARRY JOSEPH HICK, OF ALLIANCE, OHIO, ASSIGNOR TO THE HYKON MANUFAC-
TURING COMPANY, OF ALLIANCE, OHIO, A CORPORATION OF OHIO.

SHIM PLATE FOR DEMOUNTABLE RIMS.

1,410,302.  Specification of Letters Patent.  Patented Mar. 21, 1922.

Application filed August 20, 1917. Serial No. 187,325.

*To all whom it may concern:*

Be it known that I, HARRY JOSEPH HICK, a citizen of the United States, and resident of Alliance, in the county of Stark and State of Ohio, have invented certain new and useful Improvements in Shim Plates for Demountable Rims, of which the following is a specification.

The invention relates to a shim plate for the wedge of a demountable rim for automobile wheels, and the object of the improvement is to provide a simple, standard shim plate for ready and efficient use in all the varying conditions of service.

The demountable rim of an automobile wheel is usually clamped in position thereon by means of a wedge removably mounted on the draw-bolt; and as this wedge bears upon the outer free edge of the wheel rim, there is a tendency to flatten the curve of this edge of the rim, thus rendering the wedge ineffective because of the deflection of its bearing.

Again, in the use of these devices, it has been found that the wedge becomes ineffective by reason of a stretching or deflection of the demountable rim where it is acted upon by the wedge; and also that the wedge becomes ineffective because of a wear of the wedge and adjacent parts, which may be caused by a looseness of the bolt permitting friction between the parts.

These difficulties are overcome by the use of a shim plate for the wedge so as to compensate for any deflection or wear there may be in the parts, and the present invention contemplates the use of a shim plate having an L-stem provided with an elongated slot for engaging the draw bolt of the wheel, and a shim flange preferably formed with an extra thickness or a plurality of plies of metal for reinforcing the thickness of the wedge.

A preferred embodiment and use of the invention is illustrated in the accompanying drawings forming part hereof, in which—

Figure 1 is a fragmentary side elevation of the rim and tire of a wheel, with the eye of the wedge broken away to show the stem of the shim plate;

Fig. 2, a cross-section on line 2—2, Fig. 1;
Fig. 3, a cross-section on line 3—3, Fig. 1;
Fig. 4, a detached perspective view of a preferred form of shim plate;

Figs. 5, 6, 7 and 8 are detached perspective views of modified forms of shim plate; and Fig. 9, a fragmentary sketch illustrating a flattened rim which necessitates the use of the shim plate.

Similar numerals refer to similar parts throughout the drawings.

The metal rim 1 for the rubber tire 2 is mounted around the metal rim 3 of the wheel by bearing at one side against the flange 4 of the wheel rim and on the other side against wedges 5 which are inserted between the metal rims of the tire and wheel at intervals around the periphery thereof.

The wedge is usually if not universally, provided with an L-stem 6 which is provided with an elongated eye 7 for receiving the draw-bolt 8 extending through the felly 9 of the wheel, which bolt is employed for securing and clamping the wedge for holding the tire rim firmly against its bearing on the flange 4 of the wheel rim, and at the same time wedging and properly spacing the free side of the tire rim from the adjacent side of the wheel rim.

The shim plate 10 is bent at an L-angle to neatly fit in the angle formed by the wedge and its stem, the shim flange 11 of the plate being preferably formed thicker than the shim plate 12 and the shim stem is provided with an elongated slot 14 which may be in the form of a closed eye as shown, for adjustably engaging the draw-bolt 8 between the L-stem of the wedge and the face of the wheel.

The greater thickness of the shim flange 11 may be provided by bending the plate inward and under upon itself as shown in Fig. 4, or upward and over upon itself as shown in Fig. 5, or by bending it one way or another around one or more separate strips 13 as shown in Fig. 6, or by stamping it thicker than the shim stem as shown in Fig. 7; and it is obviously immaterial whether the additional thickness of metal is made by folding the shim flange upon itself under the wedge or is folded around the edge and over the other side thereof, as shown in Fig. 8; the principle of reinforcement being the same in all of these modifications of the general idea.

When the shim plate is placed in position, it is obvious that the engagement of the draw-bolt through the slot of the stem serves to hold the plate in proper position at all times, and prevents the shim flange from working out from under the wedge; and it is also obvious that the shim flange will lift or space the wedge outward from the rim of the wheel so as to compensate for a deflection or wearing of the parts to the extent of the thickness of the shim flange.

Recognizing the fact that the thickness of the shim stem holds the wedge slightly outward from the face of the wheel, thus partially neutralizing the effect of a shim flange of the same thickness as the stem, depending upon the angle of the wedge, it is preferred to make the shim flange of greater thickness than the thickness of the stem, although part of the benefit of the present invention can be obtained by making the shim flange and the stem of the same or equal thickness.

It is also obvious that the elongated slot provided in the stem flange of the shim plate permits the same to be used on wheels wherein the draw bolt is located at varying distances from the periphery of the wheel rim; and also that the same elongation of the slot enables two or more shim plates to be used under the same wedge, as shown in Fig. 2, thus providing means for compensating for a greater or less deflection or wear of the parts by the use of one or more shim plates, all exactly the same kind, and permitting the use of a single and standard form of type of wedge plate in all situations.

I claim:

1. A demountable rim wedge for an L-stem with a bolt eye therein, and a thick flat shim plate having a thin L-stem for fitting in the stem angle of the wedge and having an elongated bolt slot therein.

2. A demountable rim wedge having an L-stem and a flat shim plate having an L-stem for fitting in the stem angle of the wedge, the shim flange being folded upon itself to make it thicker than the stem.

3. A demountable rim wedge having an L-stem and a shim comprising a rim flange and an L-stem for fitting in the stem angle of the wedge, the shim flange being bent to reinforce the thickness of the wedge by a plurality of thicknesses of the flange.

HARRY JOSEPH HICK.